March 5, 1963  JIYUICHI NARA  3,080,125
PROCESS FOR MANUFACTURING WHEAT FLOUR
Filed Sept. 20, 1960
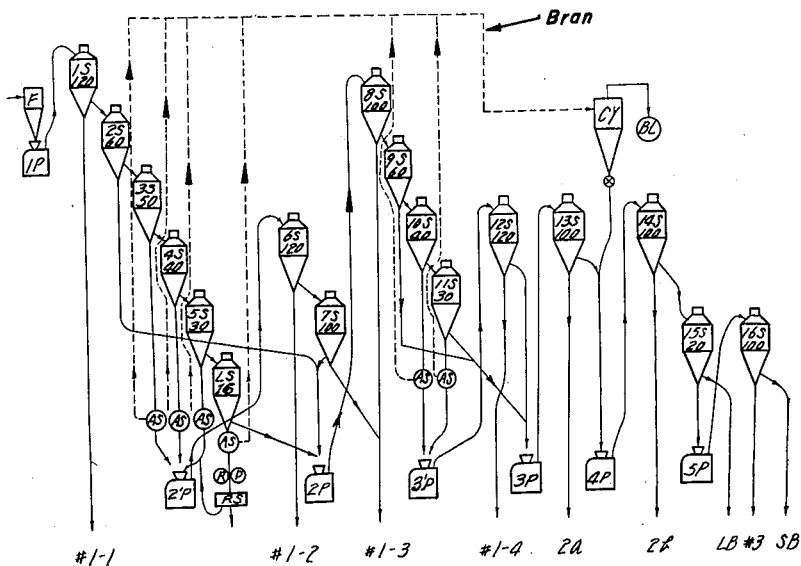
Fig 1
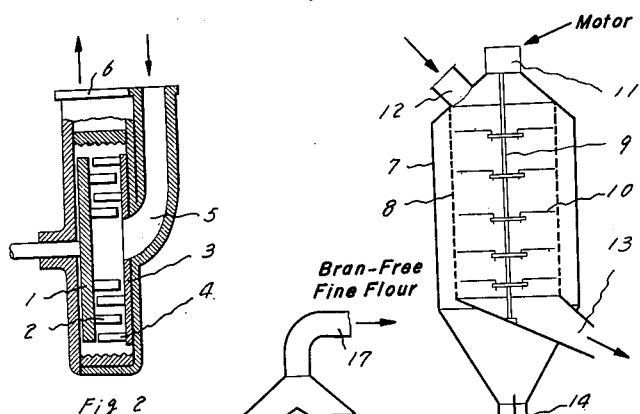
Fig 2
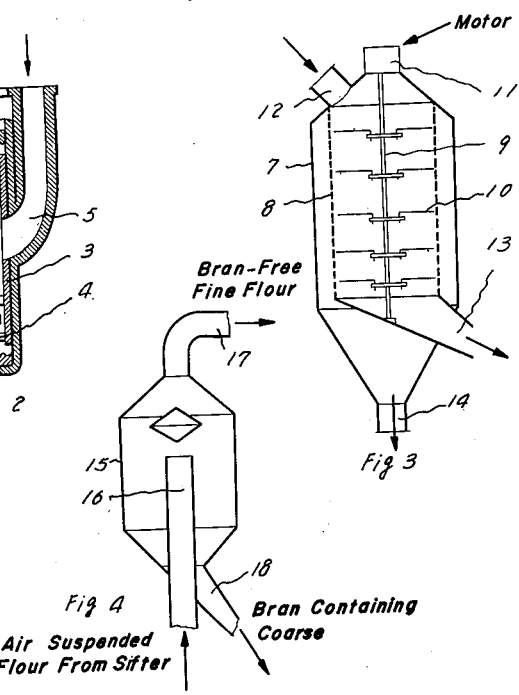
Fig 3
Fig 4
Air Suspended Flour From Sifter
Bran-Free Fine Flour
Bran Containing Coarse
INVENTOR.
JIYUICHI NARA
BY
ATTORNEY

United States Patent Office 3,080,125
Patented Mar. 5, 1963

3,080,125
PROCESS FOR MANUFACTURING
WHEAT FLOUR
Jiyuichi Nara, 80 Samezucho, Ooi, Shinagawa-ku,
Tokyo, Japan
Filed Sept. 20, 1960, Ser. No. 57,337
3 Claims. (Cl. 241—11)

This invention relates to a process for the manufacture of wheat flour, and consists in crushing the wheat grains, separating the germs from the crushed substance, further separating therefrom a coarse flour mixed with bran and another coarse bran-free flour, then giving both these coarse flours a further crushing and sieving operation of each individually different system, and finally obtaining refined flour containing no germ and bran and only the germs separately. In the flour industry hitherto, wheat flour is obtained usually containing some amount of bran or germs to a degree causing variations in quality of the flour.

According to the present invention wherein impact pulverizers are employed, refined flour without bran powder or germ powder is obtained.

First, the wheat grains are crushed by an impact-type pulverizer rotating at a speed which does not effect crushing of the germs. The coarse flour thus obtained is fed to a series of sifting apparatus which are connected together in sequence. Each sifting apparatus has a sequentially coarser mesh. By means of these sifting apparatus the coarse flour mixed with germs is pulverized as overs of the sifting meshes and the meshes of the last two sifting apparatus connected adjacently are made 30 mesh per square inch and 20 to 16 mesh per square inch respectively.

In general, wheat germs are of a size to pass screens of from 30 to 16 mesh per square inch. According to the present invention, the coarse flour containing the largest quantity of germs is obtained as unders of the sifting apparatus of 20 to 16 mesh. Subsequently, this coarse flour is directed to an air separator so that the bran contained in it can be removed after the flour has passed through the separator. Then the coarse flour thus made, free from bran, is subjected to the operation of a roller-type pulverizer.

Since germs contain plenty of fat, they are not extensively crushed or pulverized, but are merely compressed. At the same time, the pulverized flour except the germs is crushed. After this operation the resulting substance is separated into compressed germs and a finely divided flour by means of such separator as is capable of sifting the material only by means of difference in meshes, e.g. a rotating or vibrating sifter so that the germs are finally obtained, and the finely divided flour is further subjected to another crushing and sifting so that a refined flour, a second flour and a third flour are obtained respectively. The above mentioned unders of the meshes of the group of sifting apparatus are separated by means of an air separator into flour containing a great deal of bran and another bran-free flour. Then, after giving each individually different crushing and separating operation to these two kinds of flour in a repeated manner, a refined flour, a second flour and a third flour are also obtained separately.

The invention will be explained in detail with the accompanying drawings wherein; FIG. 1 is a general view showing the whole apparatus of the present invention. FIG. 2 is a view showing an example of an impact pulverizer used in the present invention. FIG. 3 is a side view in elevation of a sifter used in the present invention. FIG. 4 is a side view in elevation of an air separator of this invention.

First, as shown in FIG. 1, the wheat grains are fed from the feeder F to the first impact pulverizer 1P which is run at a comparatively slow speed to crush the germs to the least possible degree. This is possible because the germs contain much fat so that they are not so easily crushed as other portions of the grains.

Secondly, the coarse flour from the pulverizer 1P is fed to a series of sifters 1S, 2S, 3S . . . LS arranged in sequence. The meshes of these sifters are made coarser by order from 1S onwards. For instance, the mesh of the first sifter 1S is 120, and those of 2S, 3S, 4S . . . etc. are made 60 mesh, 50 mesh, 40 mesh . . . etc. respectively, as indicated upon FIG. 1. So far as the last two sifters 5S and LS are concerned, the former is made 30 mesh through which germs cannot pass, whereas the latter is made 16 mesh enabling germs to pass through it.

The overs of the first sifter 1S are fed to the second sifter 2S, the overs of the second sifter to the third sifter 3S, and also those of the third sifter to the fourth sifter, and those of the fourth sifter to the fifth sifter in sequence. In this manner, all the overs are fed to each succeeding sifter so that at length the flour containing a large percentage of germs is fed to the last sifter LS to cause the germs to pass through its mesh. The unders of the mesh of the last sifter LS are subjected to the operation of the air separator AS once so that the coarse flour containing the largest quantity of germs and bran only or the same mixed with flour can be separated from each other by means of difference in air resistance. In this manner, the coarse flour of around 30–16 mesh containing the largest quantity of germs is collected. This flour then is subjected to the operation of the pulverizer RP comprising a pair of rollers, for giving a compressing effect on the coarse flour. By this means the germs are merely compressed, but the flour except the germs is crushed until it is finely divided or pulverized. Therefore, the flour passing through the roller-type pulverizer RP can be separated by sifting means without being subjected to the operation of an air separator, that is, by a sifter such as those disclosed at col. 4, line 64 of Patent 2,392,365, e.g. a rotating sifter RS or a vibrating sifter by which the overs of the mesh of the sifter consist of compressed germs only whereas the unders of the mesh of the sifter become a wheat flour in coarse form. Therefore, the germs alone are collected independently and the coarse flour under the sifter is fed to the impact pulverizer 2′P and then sieved out through the sifters 6S, 7S, 8S etc.

Further, the flour is repeatedly crushed by the impact pulverizers 3′P, 3P, 4P etc. so that refined flours (#1–2), (#1–3), (#1–4), a second flour 2a, 2b and a third flour (#3) are obtained. On the other hand, as for the unders of the sifters 1S, 2S, 3S etc. those of the sifter 1S of 120 mesh are collected as refined flour (#1–1). All the unders of the sifters 3S, 4S, etc. are fed to respective air separators AS once so that they are separated into bran containing coarse flour and a fine flour containing no bran. Then the former is fed to the cyclone collector CY equipped with the fan BL, as shown by broken lines, so that it is crushed again by the impact pulverizers 4P, 5P and the sifters 14S, 15S and 16S for another separation, thereby obtaining a second flour 2b, a third flour (#3), Bran LB and Bran powder SB. Moreover, as has been explained above, the fine flour containing no bran, sent out from the air separators AS, is again crushed by the second impact pulverizer 2″P, after which it is sequentially crushed and separated by the impact pulverizer 2P, 3P and sifters 6S, 7S, 8S, etc. thereby obtaining a second flour 2a, a third flour (#3), Bran LB and Bran powder SB. The figures given in FIG. 1 beneath each reference character 1S, 2S, 3S, etc. indicate the numbers of the meshes per inch of the respective sifters.

The process according to the present invention provides that the wheat grains are crushed by the first crusher 1P running at a speed which does not pulverize the germs, and the substance crushed to this extent is fed to a series of sifters 1S, 2S, 3S, thus developing as the overs of the mesh of each sifter and then, they are further passed through the last sifter LS so that they are collected as the unders of the last sifter having between 30 and 16 mesh. Then, this flour is fed to the air separator AS, so that it is made free from bran mixed with it. After this operation, it is subjected to the operation of the roller-type pulverizer so that the germs alone are compressed, and simultaneously the flour except the germs is again crushed, after which the compressed germs only are separated according to granular size, by means of sifters, and also the unders of the mesh of the above mentioned sifters 1S, 2S, 3S etc. are separated into a coarse flour and bran mixed with flour, and both these kinds of flour are further crushed and separated.

FIG. 2 indicates a known example of an impact pulverizer, which is used also in the operation of the present invention. Reference 1 indicates a rotating disc, 2 a strike pin, 3 a fixed disc, 4 a strike pin, 5 an inlet for flour material and 6 an outlet for flour. FIG. 3 shows a sifter in which reference 7 indicates a cylindrical jacket, 8 a sieve, a rotatable shaft, 10 a radial lever, 11 a motor for rotating shaft 9, 12 a powder inlet, 13 an outlet for the overs of the sieve, and 14 an outlet for the unders of the sieve. FIG. 4 shows an air separator, in which reference 15 indicates a jacket, 16 a blow-up pipe for mixing flour and air, 17 an outlet pipe for flour subjected to large air resistance, and 18 an outlet pipe for flour subjected to small air resistance. The characteristics involved in the present process are that germs, and flour containing no germ or bran can be obtained separately.

What is claimed is:

1. The process of milling wheat, comprising, lightly crushing the grain, sequentially passing the crushed grain through a first series of sifters of mesh size increasing from 120 to 60, 50, 40, 30 and 16, in the order mentioned, passing the unders from each said first series of sifter from 50- down to 30-mesh, to respective air separators to remove bran therefrom, passing the unders from said 16-mesh sifter to a discrete air separator to remove bran therefrom and obtain germ, compressing the germ output of said discrete air separator in a roller type pulverizer, sifting the compressed germ to thus obtain germ and bran-free flour, and passing the bran-free flour from all the aforesaid air separators and siftings from said compressed germ, to a common, first impact pulverizer, to thus discrete bran-free flour, bran and germ.

2. The process of claim 1, including passing the unders of said 60-mesh sifter, together with the overs from said 16-mesh sifter to a second impact pulverizer, and sifting the output from said second pulverizer to obtain a second supply of bran-free flour.

3. The process of claim 2, including conducting the overs from said last mentioned sifting, sequentially to a second series of sifters of mesh sequentially decreasing from 100- to 60- to 40- to 30-mesh, passing the unders from said 40- and 30-mesh sifters of said second series, to respective air separators, to obtain a third supply of bran-free flour, passing said third supply of bran-free flour to a third impact pulverizer and sifting the residue from said third pulverizer in a 120-mesh sifter.

References Cited in the file of this patent
UNITED STATES PATENTS

| | | |
|---|---|---|
| 2,392,365 | Carter | Jan. 8, 1946 |
| 2,464,212 | Carter | Mar. 15, 1949 |
| 2,847,167 | Szasz | Aug. 12, 1958 |
| 2,879,004 | Dodds | Mar. 24, 1959 |

OTHER REFERENCES

The Pin Mill and Spiral Air Classifier by W. H. Gellich in American Miller and Processor, September 1958, pages 17, 18 and 35.